United States Patent
Pitts

(10) Patent No.: US 9,248,805 B2
(45) Date of Patent: Feb. 2, 2016

(54) MOWER BRAKE LOCK

(71) Applicant: Laroy Elbert Pitts, Montgomery, AL (US)

(72) Inventor: Laroy Elbert Pitts, Montgomery, AL (US)

(*) Notice: Subject to any disclaimer, the term of this patent is extended or adjusted under 35 U.S.C. 154(b) by 122 days.

(21) Appl. No.: 14/018,740

(22) Filed: Sep. 5, 2013

(65) Prior Publication Data

US 2015/0007618 A1 Jan. 8, 2015

Related U.S. Application Data

(60) Provisional application No. 61/843,171, filed on Jul. 5, 2013.

(51) Int. Cl.
| | | |
|---|---|---|
| *G06G 5/00* | (2006.01) | |
| *B60R 25/08* | (2006.01) | |
| *B60R 25/00* | (2013.01) | |
| *A01D 34/82* | (2006.01) | |

(52) U.S. Cl.
CPC .............. *B60R 25/086* (2013.01); *A01D 34/82* (2013.01); *B60R 25/007* (2013.01); *Y10T 70/446* (2015.04)

(58) Field of Classification Search
CPC .. B60R 25/002; B60R 25/003; B60R 25/005; B60R 25/006; B60R 25/007; B60R 25/008; B60R 25/06; B60R 25/063; B60R 25/066; B60R 25/08; B60R 25/083; B60R 25/086
USPC .......... 70/201–204, 206, 225–227, 23, 32–34
See application file for complete search history.

(56) References Cited

U.S. PATENT DOCUMENTS

| | | | | |
|---|---|---|---|---|
| 3,754,418 A * | 8/1973 | Miller | ............................. | 70/18 |
| 4,328,687 A * | 5/1982 | Ritchie | ............................. | 70/34 |
| 4,333,326 A * | 6/1982 | Winters | ............................. | 70/203 |
| 4,576,021 A * | 3/1986 | Holden | ............................. | 70/34 |
| 4,693,096 A * | 9/1987 | Mercer | .................. | B60R 25/08 70/14 |
| 4,802,351 A * | 2/1989 | Kojak | ............................. | 70/56 |
| 5,141,119 A * | 8/1992 | Milazzo | ............... | B60R 25/007 70/212 |
| 5,325,688 A * | 7/1994 | Jaw-Jia | ............................. | 70/200 |
| 5,329,793 A * | 7/1994 | Chen | ............................. | 70/209 |
| 5,433,093 A * | 7/1995 | Sooth | ............................. | 70/56 |
| 5,570,600 A * | 11/1996 | Hua | ............................. | 70/247 |
| 5,784,907 A * | 7/1998 | Hu et al. | ............................. | 70/203 |
| 6,029,483 A * | 2/2000 | Daniels | ............................. | 70/199 |
| 6,382,000 B1 * | 5/2002 | Horton | ............................. | 70/163 |
| 6,519,983 B2 * | 2/2003 | Witchey | ............... | B60R 25/008 70/14 |
| 6,539,757 B2 * | 4/2003 | Witchey | ............................. | 70/202 |
| 6,796,154 B2 * | 9/2004 | Gebow et al. | ............................. | 70/226 |

* cited by examiner

*Primary Examiner* — Christopher Boswell

(57) ABSTRACT

A brake lock for a riding mower. The brake lock may include a shaft having a first end and a second end. A blocker may be attached to the first end and a shackle may be attached to the second end. The present invention may further include a padlock having a shackle hole and an activation component that locks and unlocks the padlock. The shaft may be placed within a brake housing blocking a brake handle from moving. The shackle of the shaft may be locked within the shackle hole and may thereby lock the brake handle in a braked position.

8 Claims, 3 Drawing Sheets

MOWER BRAKE LOCK

CROSS-REFERENCE TO RELATED APPLICATION

This application claims the benefit of priority of U.S. provisional application No. 61/843,171, filed Jul. 5, 2013, the contents of which are herein incorporated by reference.

BACKGROUND OF THE INVENTION

The present invention relates to brake lock and, more particularly, to a brake lock that locks a mower in a braked position.

A lawn mower is a machine that uses a revolving blade or blades to cut a lawn at an even height. Riding mowers are a popular alternative for large lawns. The operator is provided with a seat and controls on the mower and literally rides on the machine. Most use the horizontal rotating blade system, though usually with multiple blades.

Riding lawn mowers are regularly stolen as many manufacturers use the same ignition key for all of their mowers. Since the parking brake of a riding lawn mower cannot be locked, thieves may use the keys to steal them. Further, chaining and padlocking the lawn mowers does not prevent them from being stolen because chains and padlocks may be cut.

As can be seen, there is a need for a device to prevent mowers from being stolen.

SUMMARY OF THE INVENTION

In one aspect of the present invention, a mower brake lock comprises: a shaft having a first end and a second end; a blocker attached to the first end of the shaft, wherein the blocker comprises a larger width than the shaft; a padlock body comprising a padlock and an activation component operatively connected to the padlock, wherein the padlock body comprises a shackle hole leading to the padlock; and a shackle attached to the second end of the shaft, wherein the shackle is sized to fit within the shackle hole.

In another aspect of the present invention, a method of locking a mower comprises: providing a mower brake lock comprising a shaft having a first end and a second end; a blocker attached to the first end of the shaft, wherein the blocker comprises a larger width than the shaft; a padlock body comprising a padlock and an activation component operatively connected to the padlock, wherein the padlock body comprises a shackle hole leading to the padlock; and a shackle attached to the second end of the shaft, wherein the shackle is sized to fit within the shackle hole; activating a parking brake of a lawn mower by moving a brake handle within a housing to a brake position; placing the shaft of the mower brake lock through the housing, thereby blocking the handle from moving to a drive position; and inserting the shackle into the shackle hole and thereby locking the shaft to the padlock.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a brake lock for a riding mower. The brake lock may include a shaft having a first end and a second end. A blocker may be attached to the first end and a shackle may be attached to the second end. The present invention may further include a padlock having a shackle hole and an activation component that locks and unlocks the padlock. The shaft may be placed within a brake housing blocking a brake handle from moving. The shackle of the shaft may be locked within the shackle hole and may thereby lock the brake handle in a braked position.

The present invention may include a brake lock for a mower. The brake lock of the present invention may securely lock the emergency brake of certain lawn mowers in place, making the mower immoveable. The brake lock of the present invention may be placed within a parking brake housing and thereby preventing the parking brake handle from be moved to the unlocked position. Therefore, the parking brake handle is blocked in the locked position and a user may not unlock the parking brake unless the user has a key or knows a security code to unlock the brake lock.

Figure 1:
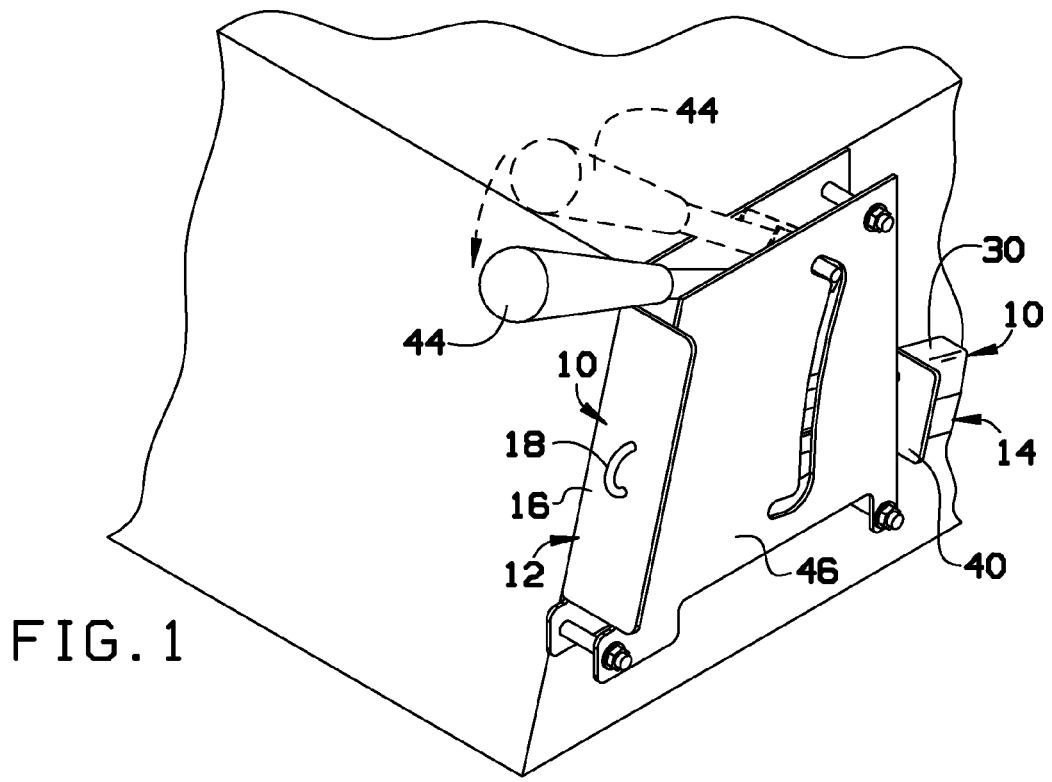
FIG. 1 a perspective view of the present invention shown in use.
Figure 2:
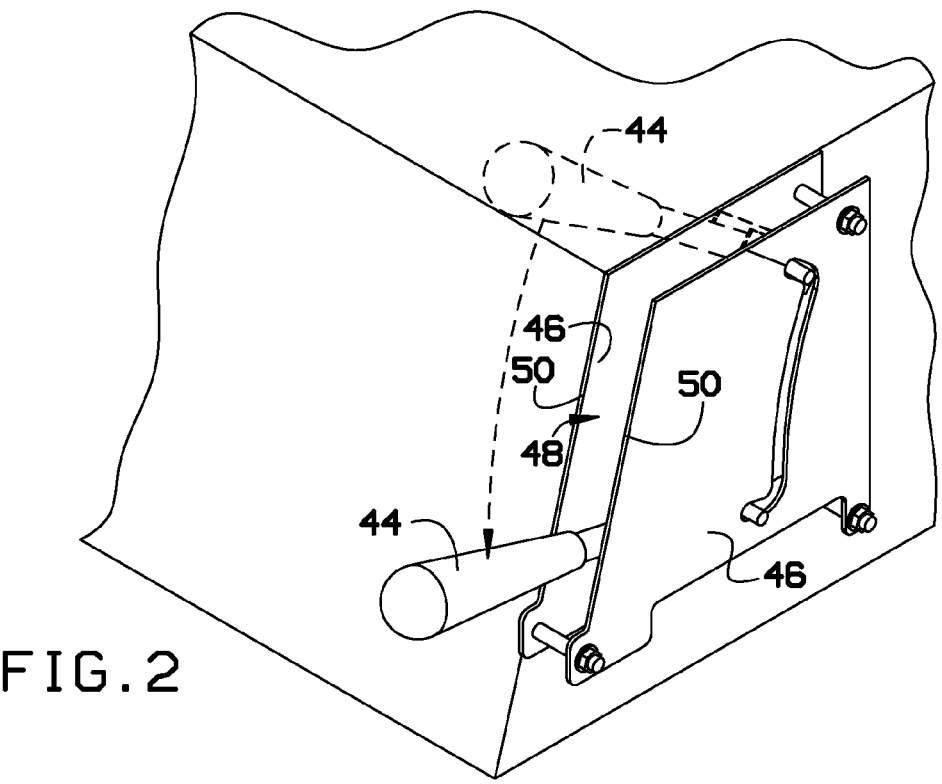
FIG. 2 is a perspective view demonstrating full range of movement of the parking brake handle without the usage of the present invention.
Figure 3:
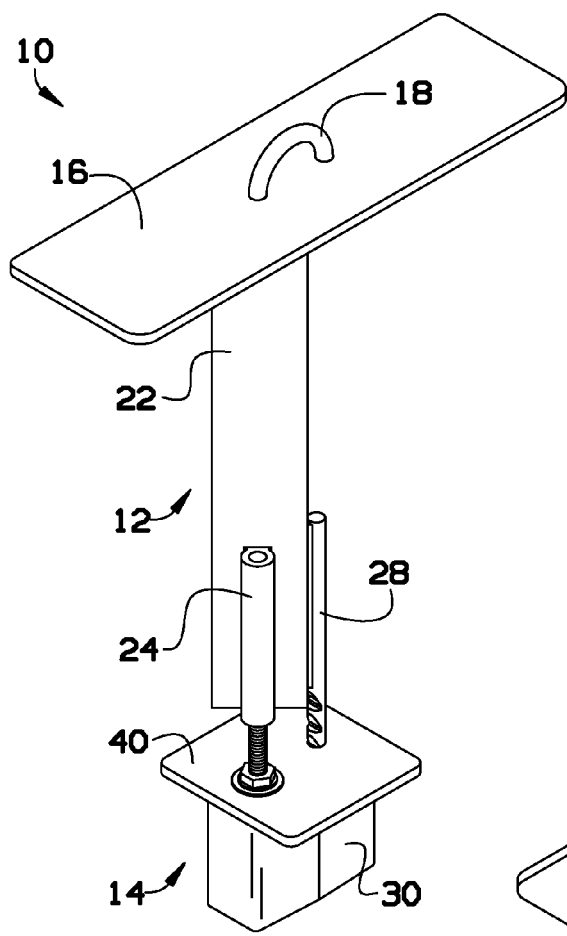
FIG. 3 is a top perspective view of the present invention.
Figure 4:
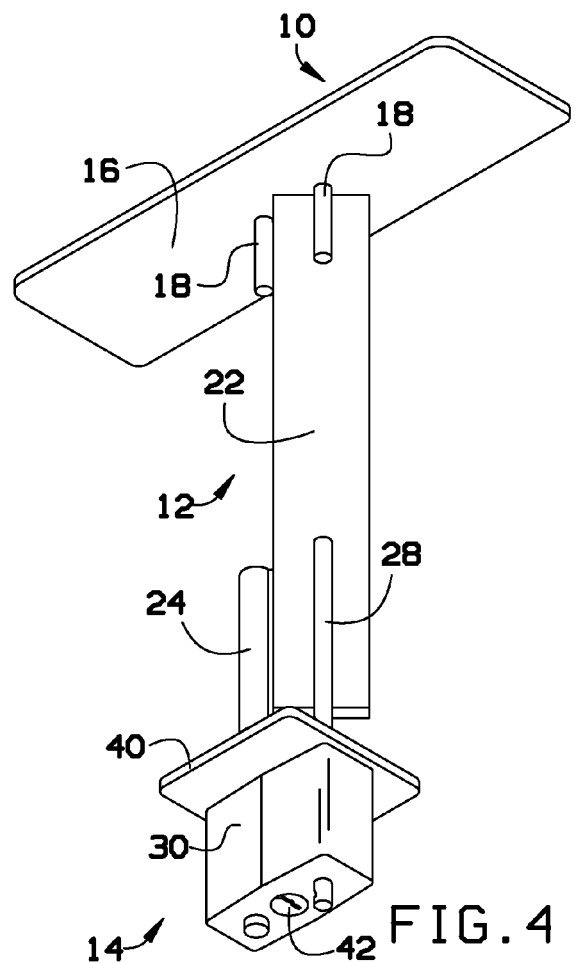
FIG. 4 is a bottom perspective view of the present invention.
Figure 5:
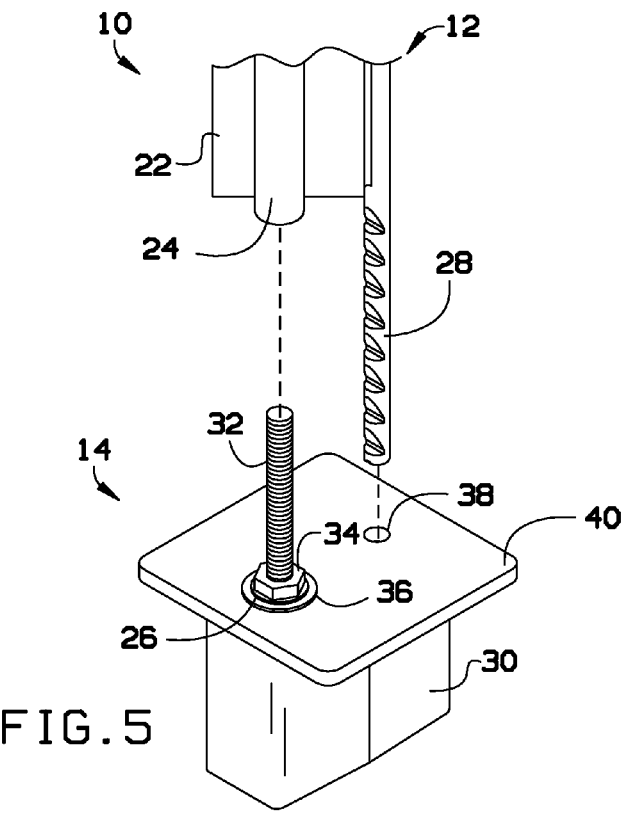
FIG. 5 is a detail exploded view of the present invention.
Figure 6:
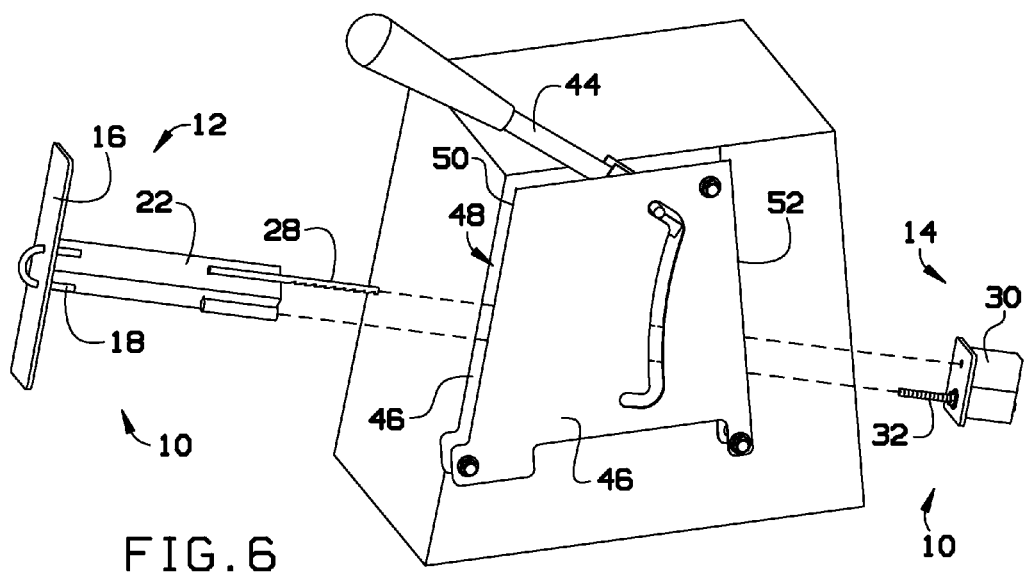
FIG. 6 is an exploded view of the present invention demonstrating an installation method.

Referring to FIGS. 1 through 6, the present invention may include a mower brake lock 10. The brake lock 10 may include a shaft 22 having a first end and a second end. A blocker 16 may be attached to the first end of the shaft 22. The blocker 16 may have a larger width than the shaft 22. The present invention may further include a padlock body 30 having a padlock within. An activation component 42, such as a key port and key, may be operatively connected to the padlock to lock and unlock. The padlock body 30 may include a shackle hole 38 that may lead to the padlock. The present invention may further include a shackle 28 attached to the second end of the shaft 22. The shackle 28 is sized to fit within the shackle hole 38 and may be secured by the padlock.

In certain embodiments, the shaft 22 of the present invention may be a body angle shaft. The shaft 22 may be made of a metal, such as iron, steel and the like. In certain embodiments, the shaft 22 may be about ⅜ of an inch of angle iron and about six and a half inches in length. The shaft 22 of the present invention may fit within a handle travel slot 48 of a parking brake housing 46 on a mower.

The blocker 16 of the present invention may be a metal plate. In certain embodiments, the blocker 16 may be about ⅛$^{th}$ of an inch in thickness and may be about seven inches by two inches with about ¼ of an inch holes drilled through the surface. However, the blocker 16 may be any size so that the blocker 16 may not fit within the handle travel slot 48. In certain embodiments, a handle 18 may be attached to the plate. In certain embodiments the handle 18 may be about five inches of ¼ inch tubular metal, such as steel, bent into a U-shape. The ends of the handle 18 may fit through the holes of the blocker 16 and may be attached to the shaft 22.

In certain embodiments, the present invention may further include a tubular receiver 24 and a bolt 32. The bolt 32 may fit within the tubular receiver 24. The tubular receiver 24 may either be part of the padlock body 30 or the shaft 22. Further, the bolt 32 may be part of the padlock body 30 or the shaft 22. In certain embodiments, a pad lock plate 40 may be mounted to the pad lock body 30. As illustrated in the Figures, the bolt 32 may be mounted to the padlock plate 40 by a nut 34, a flat washer 36 and a lock washer 26. In such embodiments, the tubular receiver 24 may be mounted to the shaft 22. The bolt 32 and the tubular receiver 24 may stabilize the padlock body and the shaft 22. Further, the nut 34 may be used to secure the padlock plate 40 to the padlock body 30.

The present invention may be used with mowers, such as the ZTR zero turn mowers. The braking system of the mower may include a housing 46 made of bracket plates. The housing may include a handle travel slot 48 in which the brake handle 44 may travel. The parking brake may be activated by moving the brake handle 44 along the handle travel slot 48. The housing may further include a front end 50 and a rear end 52. The brake handle 44 may be placed in the brake position. The shaft 22 of the mower brake lock 10 may be placed through handle travel slot 48 of the housing from the front end 50 and may extend past the rear end 52. The shackle 28 may be placed within the shackle hole 38 to lock the shaft 22 to the padlock body 30. The blocker 16 may rest against the front end 50 and the shaft 22 may prevent the brake handle 44 from being moved to the drive position.

It should be understood, of course, that the foregoing relates to exemplary embodiments of the invention and that modifications may be made without departing from the spirit and scope of the invention as set forth in the following claims.

What is claimed is:

1. A mower brake lock comprising:
    a shaft having a first end and a second end, wherein the shaft is sized to fit through a handle travel slot of a brake housing;
    a blocker attached to the first end of the shaft, wherein the blocker comprises a greater width than the shaft and is sized to have a greater width than the handle travel slot;
    a padlock body comprising a padlock and an activation component operatively connected to the padlock, wherein the padlock body comprises a shackle hole leading to the padlock, wherein the padlock body is sized to have a greater width than the handle travel slot;
    a shackle permanently affixed to and extending from the second end of the shaft, wherein the shackle is sized to fit within the shackle hole and releasably lock to the padlock body
    a tubular receiver mounted to and substantially parallel with the shaft; and
    a bolt extending from and substantially perpendicular with the padlock body, wherein the bolt is sized to fit within the tubular receiver when the shackle is within the shackle hole.

2. The mower brake lock of claim 1, wherein the blocker is a plate.

3. The mower brake lock of claim 2, further comprising a handle mounted to the plate.

4. The mower brake lock of claim 3, wherein the handle is a U-shaped handle comprising ends that pass through the plate and connect to the shaft.

5. The mower brake lock of claim 1, further comprising a pad lock plate mounted to the pad lock body.

6. The mower brake lock of claim 5, wherein the pad lock plate comprises the bolt and the shackle hole.

7. The mower brake lock of claim 1, wherein the activation component comprises a key and a key port.

8. A method of locking a mower comprising:
    providing a mower brake lock comprising a shaft having a first end and a second end; a blocker attached to the first end of the shaft, wherein the blocker comprises a larger width than the shaft; a padlock body comprising a padlock and an activation component operatively connected to the padlock, wherein the padlock body comprises a shackle hole leading to the padlock; and a shackle attached to the second end of the shaft, wherein the shackle is sized to fit within the shackle hole;
    activating a parking brake of a lawn mower by moving a brake handle within a housing slot of a brake housing to a brake position;
    placing the shaft of the mower brake lock through the housing slot, thereby blocking the handle from moving within the housing slot to a drive position; and
    inserting the shackle into the shackle hole and thereby locking the shaft to the padlock.

\* \* \* \* \*